US011533502B2

(12) United States Patent
Poirier et al.

(10) Patent No.: US 11,533,502 B2
(45) Date of Patent: Dec. 20, 2022

(54) ASYMMETRIC CODING UNIT SIZE BLOCK DEPENDENT RATIO

(71) Applicant: INTERDIGITAL MADISON PATENT HOLDINGS, SAS, Paris (FR)

(72) Inventors: Tangi Poirier, Cesson-Sevigne (FR); Franck Galpin, Cesson-Sevigne (FR); Fabrice Leleannec, Cesson-Sevigne (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 742 days.

(21) Appl. No.: 16/477,016

(22) PCT Filed: Jan. 5, 2018

(86) PCT No.: PCT/EP2018/050294
§ 371 (c)(1),
(2) Date: Jul. 10, 2019

(87) PCT Pub. No.: WO2018/130472
PCT Pub. Date: Jul. 19, 2018

(65) Prior Publication Data
US 2019/0356927 A1 Nov. 21, 2019

(30) Foreign Application Priority Data
Jan. 11, 2017 (EP) ..................................... 17305035

(51) Int. Cl.
*H04N 19/50* (2014.01)
*H04N 19/119* (2014.01)
(Continued)

(52) U.S. Cl.
CPC ........... *H04N 19/50* (2014.11); *H04N 19/119* (2014.11); *H04N 19/176* (2014.11); *H04N 19/44* (2014.11)

(58) Field of Classification Search
CPC .... H04N 19/50; H04N 19/119; H04N 19/176; H04N 19/44; H04N 19/136
See application file for complete search history.

(56) References Cited

U.S. PATENT DOCUMENTS

2011/0182523 A1* 7/2011 Kim ....................... H04N 19/11
382/233
2013/0034154 A1* 2/2013 Song .................... H04N 19/109
375/240.03

(Continued)

FOREIGN PATENT DOCUMENTS

CN 101321283 12/2008
CN 101325714 12/2008

(Continued)

OTHER PUBLICATIONS

Chen et al., Algorithm description of joint Exploration Test Exploration Test Mode 3, Joint Video Exploration Team (JVET) of ITU-T SG 16 WP 3 and ISO/IEC JTC 1/SC 29/WG 11, 3rd meeting: Geneva, CH, May 26-Jun. 1, 2016, pp. 1-32.

(Continued)

*Primary Examiner* — Nam D Pham
(74) *Attorney, Agent, or Firm* — Ronald Kolczynski

(57) ABSTRACT

A block of video data is split and coded using existing transform sizes through one of several embodiments. In one embodiment, the block is split in alternate dimensions, depending on the block size. In another embodiment, the video block can be coded after splitting the block into at least two rectangular sub-blocks using horizontal or vertical divisions. Successive divisions using asymmetric splitting are forbidden if an equivalent split can be attained using only (Continued)

symmetrical splitting, and only one succession of divisions is permitted when there are other successions of asymmetric splitting that result in the identical sub-blocks. In another embodiment, a video block is split using successive splits, but the second type of split is dependent on the first type of split. Methods, apparatus, and signal embodiments are provided for encoding and decoding.

13 Claims, 21 Drawing Sheets

(51) Int. Cl.
*H04N 19/176* (2014.01)
*H04N 19/44* (2014.01)

(56) References Cited

U.S. PATENT DOCUMENTS

| | | | | |
|---|---|---|---|---|
| 2014/0177713 A1* | 6/2014 | Yuan | .................... | H04N 19/122 375/240.18 |
| 2016/0366416 A1* | 12/2016 | Liu | ........................ | G06T 7/246 |

FOREIGN PATENT DOCUMENTS

| | | |
|---|---|---|
| CN | 101500159 | 8/2009 |
| CN | 102598669 | 7/2012 |
| CN | 103108177 | 5/2013 |
| CN | 103796031 | 5/2014 |
| CN | 104285447 | 1/2015 |
| WO | WO 2014120367 | 8/2014 |
| WO | WO2018092870 | 5/2018 |

OTHER PUBLICATIONS

Leleannec et al., Asymmetric Coding Units in QTBT, Joint Video Exploration team (JVET) of ITU-T 16 WP 3 and ISO/IEC JTC 1/SC 29/WG 11 4th Meeting, Chengdu, CN, Oct. 15-21, 2016, Document JVET-D0064.

Li et al., Multi-Type-Tree, Joint Video Exploration Team (JVET) of ITU-T SG 16 WP 3 and ISO/IEC JTC 1/SC JTC 1/SC 29/WG 11 4th Meeting, Chengdu, CN, Oct. 15-21, 2016, Document, JVET-D0117r1.

* cited by examiner

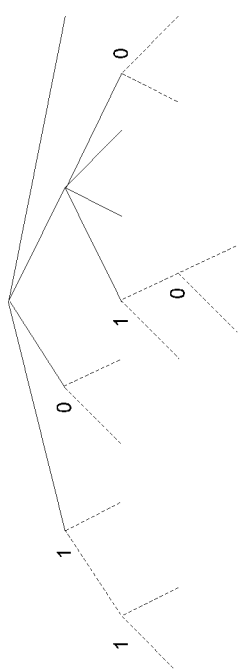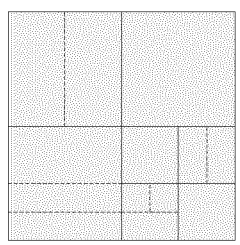
Figure 4

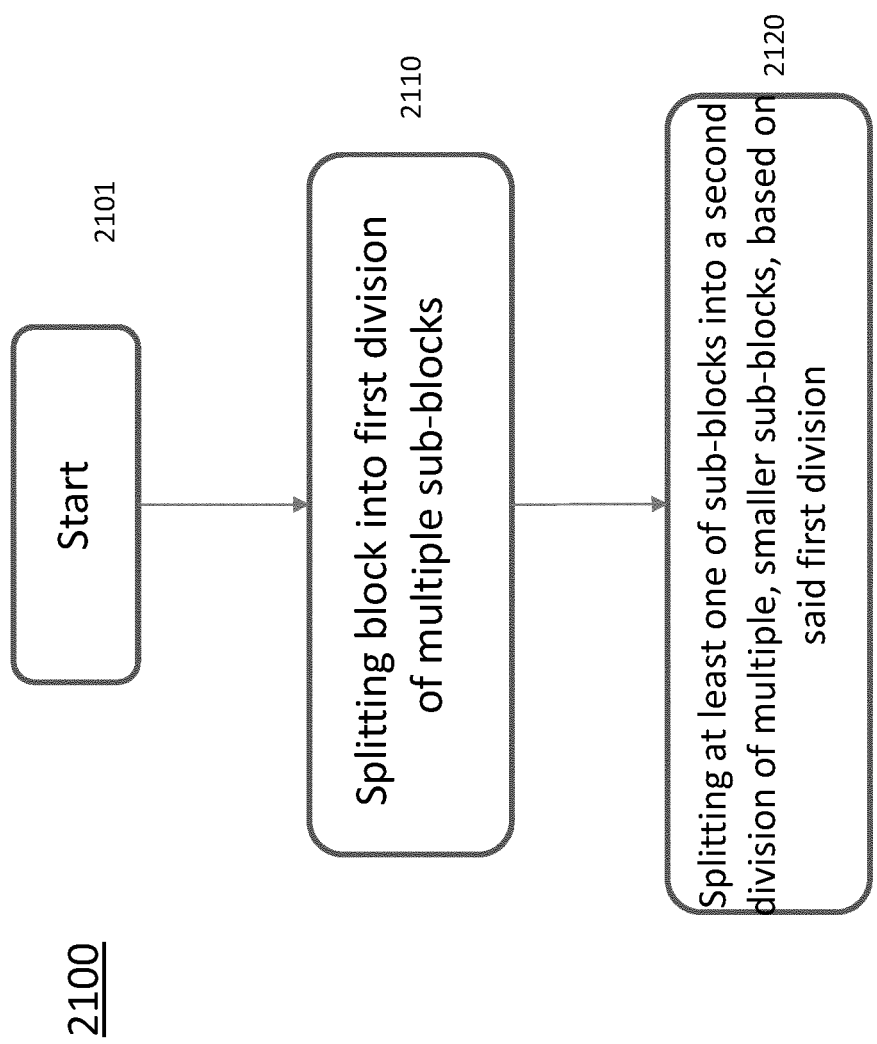

ASYMMETRIC CODING UNIT SIZE BLOCK DEPENDENT RATIO

FIELD OF THE INVENTION

The present principles relate to the field of video compression.

BACKGROUND OF THE INVENTION

In the HEVC video compression standard, a picture is divided into so-called Coding Tree Units (CTU), whose size is typically 64×64, 128×128, or 256×256 pixels.

Each CTU is represented by a Coding Tree in the compressed domain. This is a quad-tree division of the CTU, where each leaf is called a Coding Unit (CU), as shown in FIG. 1.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

The Partitioning of a Coding Unit into Prediction Unit(s) is done according to the partition type, signaled in the bit-stream. For Intra coding unit, only the partition types 2N×2N and N×N, illustrated in FIG. 3, are used. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain is proposed, in order to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC:

The QTBT decomposition of a CTU is made of two stages: first the CTU is split in a quad-tree fashion, then each quad-tree leaf can be further divide in a binary fashion. This is illustrated on the right of FIG. 4 where solid lines represent the quad-tree decomposition phase and dashed lines represent the binary decomposition that is spatially embedded in the quad-tree leaves.

In intra slices, the Luma and Chroma block partitioning structure is separated, and decided independently.

No more CU partitioning into predictions units or transform unit is employed.

In other words, each Coding Unit is systematically made of a single prediction unit (previously 2N×2N prediction unit partition type) and single transform unit (no division into a transform tree).

However, further improved compression efficiency is needed compared to QTBT technology.

SUMMARY OF THE INVENTION

These and other drawbacks and disadvantages of the prior art are addressed by at least one of the described embodiments, which are directed to a method and apparatus for coding or decoding a block of video data. In at least one embodiment, the block of video data is divided into sub-blocks, at least one of which has a size that is not a power of two in height or width.

According to at least one general embodiment described herein, there is provided a method for coding a block of video data. The method comprises dividing the block into at least two rectangular sub-blocks, and encoding each sub-block using processing such that a transform that corresponds to each sub-block size is used.

According to at least one general embodiment described herein, there is provided a method for decoding a block of video data. The method comprises decoding at least one sub-block of a plurality of sub-blocks that comprise the block, using processing such that a transform that corresponds to each sub-block size is used, and reassembling the plurality of sub-blocks into the block, wherein reassembling comprises an inverse operation of dividing the block.

According to another general embodiment described herein, there is provided an apparatus for coding a block of video data. The apparatus comprises a memory, and a processor, configured to divide the block into at least two rectangular sub-blocks, and encode each sub-block using processing such that a transform that corresponds to each sub-block size is used.

According to another general embodiment described herein, there is provided an apparatus for decoding a block of video data. The apparatus comprises a memory, and a processor, configured to decode at least one sub-block of a plurality of sub-blocks that comprise the block, using processing such that a transform that corresponds to each sub-block size is used, and reassemble the plurality of sub-blocks into said block, wherein reassembling comprises an inverse operation of dividing the block.

According to another general aspect described herein, there is provided any of the above four embodiments wherein, dividing comprises splitting the block into a first division of multiple sub-blocks if the block has a size dimension that is not a multiple of three, and wherein the block is split into a second division of multiple sub-blocks if the block has a size dimension that is a multiple of three.

According to another general aspect described herein, there is provided any of the above first four embodiments wherein, dividing comprises splitting said block into at least two rectangular sub-blocks using horizontal or vertical divisions, wherein successive divisions using asymmetric splitting are forbidden if an equivalent split can be attained using only symmetrical splitting, and wherein only one succession of divisions is permitted when there are other successions of asymmetric splitting that result in identical sub-blocks.

According to another general aspect described herein, there is provided any of the above first four embodiments wherein, dividing comprises splitting the block into a first division of multiple sub-blocks, and splitting at least one of the sub-blocks into a second division of multiple, smaller sub-blocks, based on the first division.

According to another aspect described herein, there is provided a nontransitory computer readable storage medium containing data content generated according to the method of any one of the aforementioned method embodiments, or by the apparatus of any one of the aforementioned apparatus embodiments for playback using a processor.

According to another aspect described herein, there is provided a signal comprising video data generated according to the method of any one of the aforementioned method embodiments for coding a block of video data, or by the apparatus of any one of the aforementioned apparatus embodiments for coding a block of video data, for playback using a processor.

According to another aspect described herein, there is provided a computer program product comprising instructions which, when the program is executed by a computer, cause the computer to carry out the method of any one of the aforementioned method embodiments.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 4 shows an example quad-tree plus binary-tree coding tree unit representation.

FIG. 21 shows another embodiment of a method for dividing a block of video data using at least one general aspect described herein.

DETAILED DESCRIPTION

An approach is described for improved compression efficiency and reduced complexity in video compression.

At least one embodiment of this description proposes a new representation of Coding Structure, so as to represent the picture in a better way in the compressed domain.

In this description, a new representation of Coding Structure is introduced for an improved representation in the compressed domain. For clarity, in this description, "dividing", "segmenting" and "splitting" all mean the same thing, which is a the act of performing a straight-line division of a block of pixels. Similarly, "splits", and "divisions" mean the same thing, a grouping of pixels as a result of dividing, splitting or segmenting a block or a sub-block.

Figure 1:
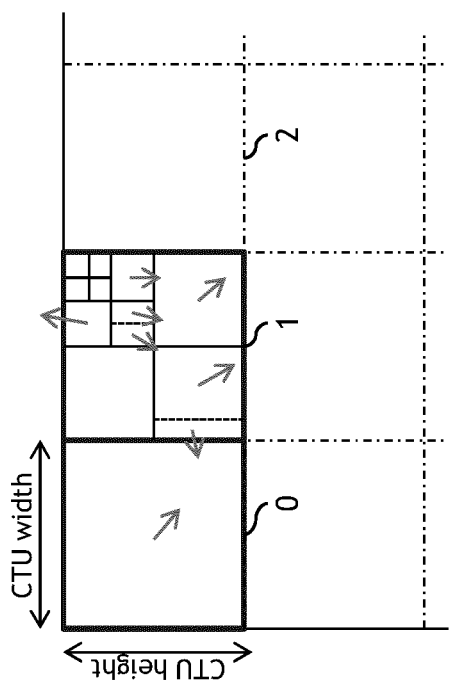
FIG. 1 shows one example of a coding tree unit and coding tree concepts to represent a compressed picture.

In the HEVC video compression standard, a picture is divided into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU), see FIG. 1.

Figure 2:
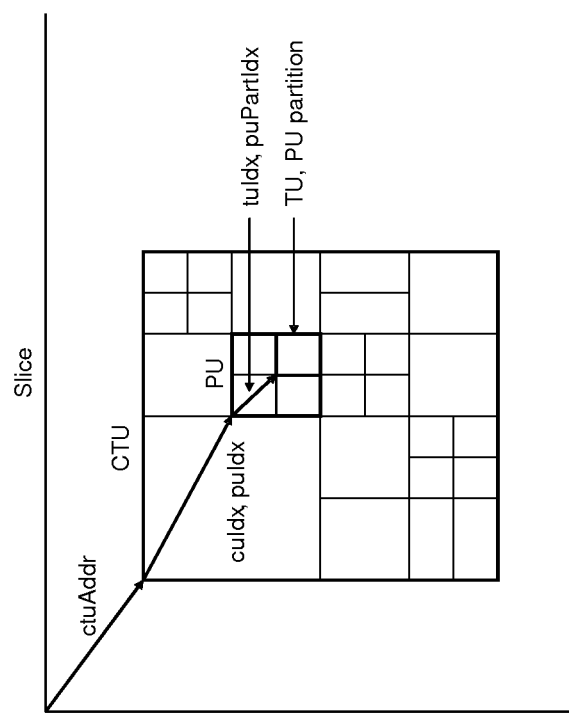
FIG. 2 shows an example of the division of a coding tree unit into coding units, prediction units and transform units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Figure 3:
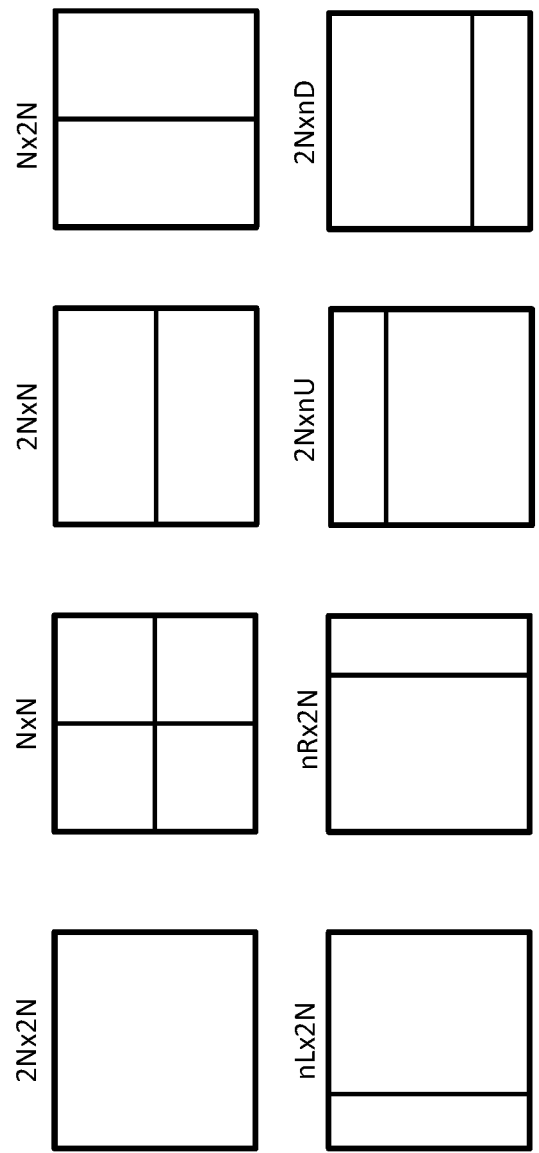
FIG. 3 shows an example of partitioning of coding units into prediction units.
Figure 5:
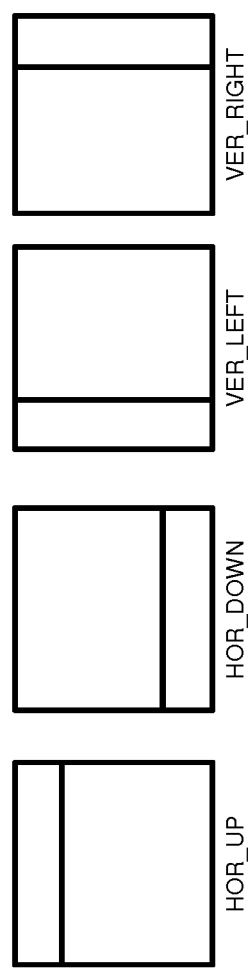
FIG. 5 shows examples of additional coding unit binary asymmetric splitting modes in QTBT+ACU.
Figure 6:
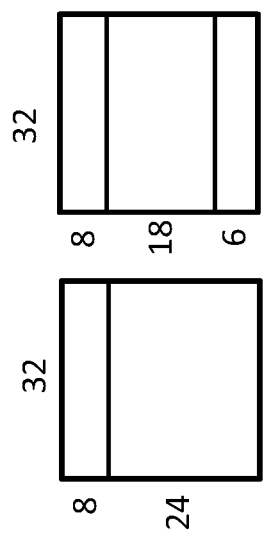
FIG. 6 shows successive asymmetric splitting of a block.

The Partitioning of a Coding Unit into Prediction Unit(s) is done according to the partition type, signaled in the bit-stream. For Intra coding unit, only the partition types 2N×2N and N×N, illustrated in FIG. 3 are used. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools include a Coding Tree Unit representation in the compressed domain is proposed, in order to represent picture data in a more flexible way in the compressed domain. The advantage of this flexible representation of the coding tree is that it provides increased compression efficiency compared to the CU/PU/TU arrangement of the HEVC standard.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In additional to this variety of rectangular shapes for a coding unit, this new CTU representation has the following different characteristics compared to HEVC:

The QTBT decomposition of a CTU is made of two stages: first the CTU is split in a quad-tree fashion, then each quad-tree leaf can be further divide in a binary fashion. This is illustrated on the right of FIG. 4 where solid lines represent the quad-tree decomposition phase and dashed lines represent the binary decomposition that is spatially embedded in the quad-tree leaves.

In intra slices, the Luma and Chroma block partitioning structure is separated, and decided independently.

No more CU partitioning into predictions units or transform unit is employed.

In other words, each Coding Unit is systematically made of a single prediction unit (previously 2N×2N prediction unit partition type) and single transform unit (no division into a transform tree).

The described embodiments concern the domain of picture coding unit representation in compression and aims at further improved compression efficiency compared to QTBT technology.

In another application, (Asymmetric Coding Units Codec Architecture, EP-IPA 16306308.4), it is proposed to introduce new asymmetric partitions in QTBT. These new shapes consist in sizes equal to $3 \cdot 2^n$ in width and/or height. Furthermore, a CU with a size multiple of 3 in width or height can be further split in a binary fashion, horizontally or vertically. We call this type of split, a one quarter split.

As a consequence, a square coding unit with size (w,h) (width and height) that would be split through one of the proposed one quarter split modes, for example HOR_UP (horizontal-up), would lead to 2 sub-coding units with respective rectangular sizes $$\left(w, \frac{h}{4}\right) \text{ and } \left(w, \frac{3h}{4}\right).$$

One problem solved by these embodiments is how to support the coding/decoding with current one quarter split, when one of the sub-blocks has a size $3 \cdot 2^n$ in one direction. If we split this sub-block again with a one quarter split in the same direction, we will obtain 2 blocks of size $3 \sim 2^{n-2}$ and $3^2 \cdot 2^{n-2}$ in the same direction. For example two successive asymmetric horizontal top split: a block 32×32 is first divided into 32×8 and 32×24, the second sub-block is then divided further in 32×6 and 32×18.

A drawback is that blocks of size 18 cannot be divided by 4, so it can't be further split. Successive asymmetric split will lead to many different block sizes. Many different block sizes will require many new transform sizes associated with each block size. These transforms require a lot of memory for a fast and efficient implementation.

Figure 7:
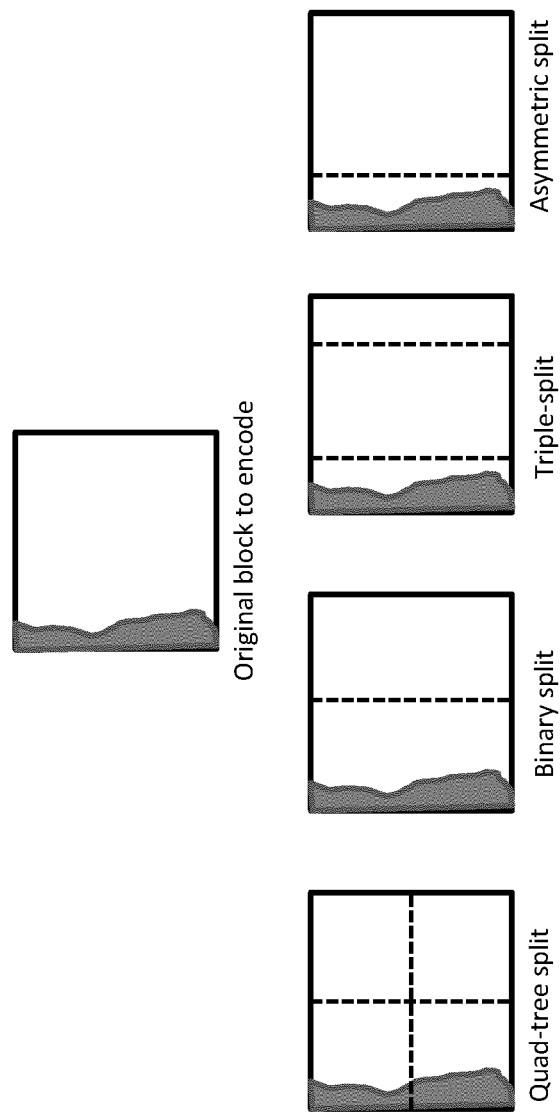
FIG. 7 shows different splits of a block to handle a block non-uniformity.
Figure 8:
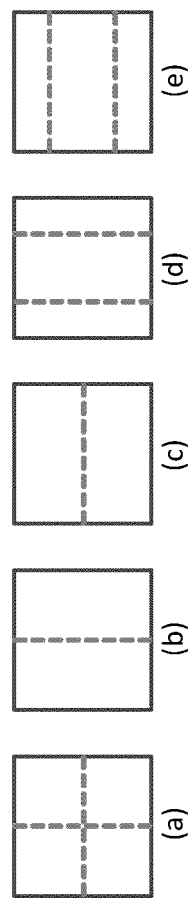
FIG. 8 shows (a) quad-tree partitioning (b) vertical binary-tree partitioning (c) horizontal binary-tree partitioning (d) vertical center-side triple-tree partitioning (e) horizontal center-side triple-tree partitioning.

In a prior approach, triple-trees are introduced. One of the advantage is that all sub-blocks are a power of 2. The main drawback is that it does not offer as much flexibility to optimally choose the partitioning of the block as it enforces 3 sub-blocks, even if only 2 are necessary. For example, when the boundary of an object is passing close to the border (see FIG. 7, triple-split vs asymmetric split).

The basic idea of the proposed approach is to have an asymmetric split ratio dependent on the block size. For a coding unit with size (w, h) (width and height) with height $2^n$, asymmetric split type HOR_UP (horizontal-up) leads to 2 sub-coding units with respective rectangular sizes $$\left(w, \frac{h}{4}\right) \text{ and } \left(w, \frac{3h}{4}\right).$$

But for a coding unit with size (w,h) with height $3 \cdot 2^n$, asymmetric split type HOR_DOWN (horizontal-down), will lead to 2 sub-coding units with respective rectangular sizes $$\left(w, \frac{2h}{3}\right) \text{ and } \left(w, \frac{h}{3}\right).$$

Figure 9:
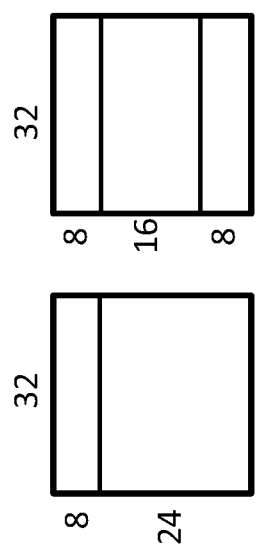
FIG. 9 shows a first asymmetric split (HOR_UP ¼) followed by a second asymmetric split (HOR_DOWN ⅓) of a block.

We call this type of split, a one third split. An example is shown in FIG. 9.

For example, for a block 32×32, a first asymmetric split leads to 32×8 and 32×24 blocks, a second asymmetric split for the second sub-block leads to 32×16 and 32×8 sub-blocks. So, the splitting size (one-quarter/one-third split) depends on the current size of the block.

The syntax as described in the aforementioned prior approach is not impacted by the proposed embodiments described herein, only the interpretation of the split is changed.

Figure 10:
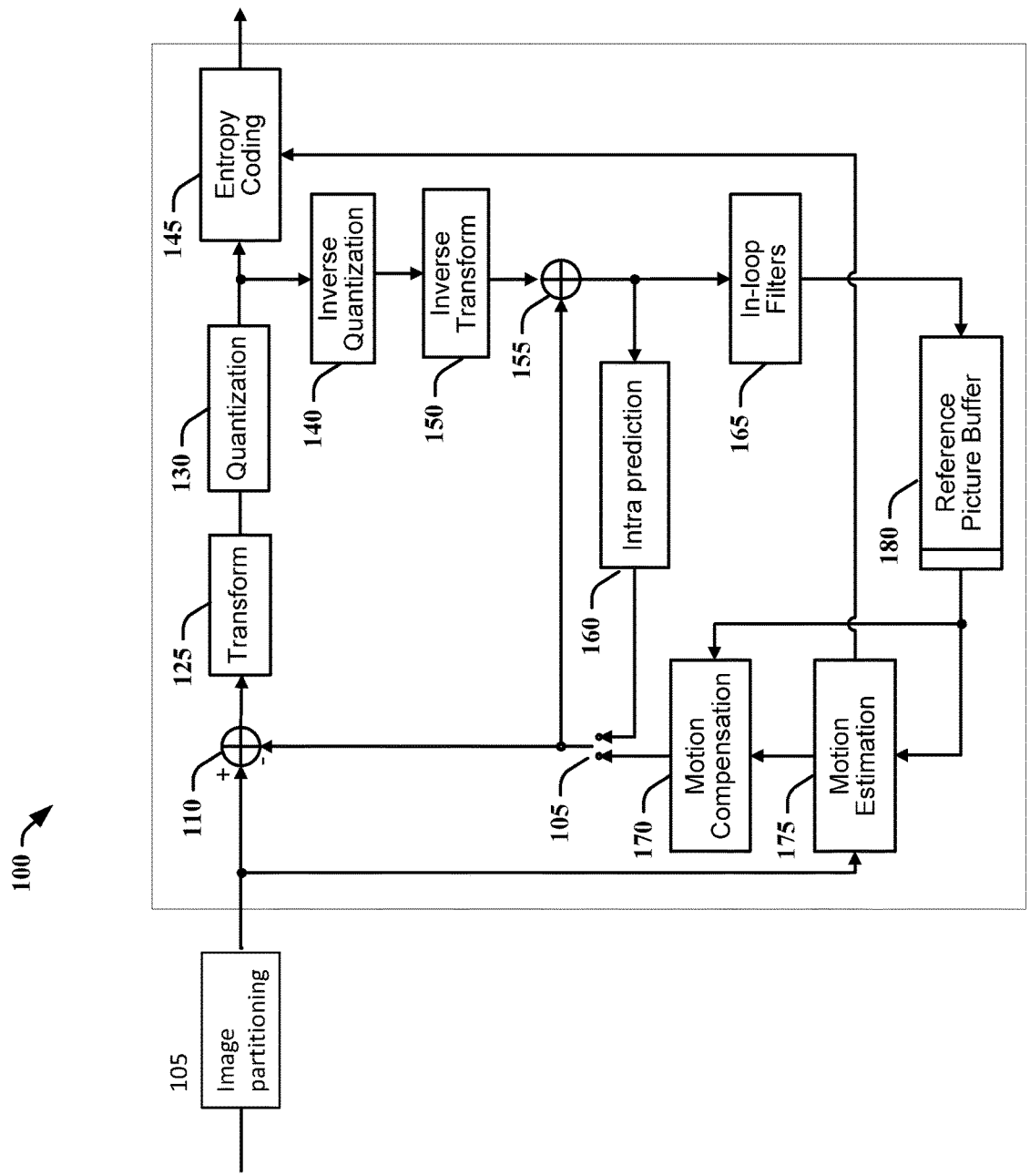
FIG. 10 shows a generic video compression scheme.

The codec module that is impacted concerns the division of the picture to code/decode in blocks (see 105 in FIG. 10) with various square and rectangular sizes.

TABLE 1 modified coding binary-tree syntax according to this proposed embodiment

Descriptor

```
coding_binary_tree( x0, y0, width, height, cqtDepth) {
    if(btSplitAllowed(x0,y0,width,height){
        bt_split_mode(x0,y0,width,height,cqtDepth)
    }
    if( btSplitFlag ) {
        if(btSplitMode==HOR)
        {
            x1 =x0
            y1 = y0 + ( height / 2 )
                sub_width_1 = sub_width_0 = width;
                sub_height_1 = sub_height_0 = (height / 2)
        }
```

TABLE 1-continued modified coding binary-tree syntax according to this proposed embodiment Descriptor

```
        if(btSplitMode==VER)
        {
         x1 = x0 + ( width / 2 )
         y1 = y0
                sub_width_1 = sub_width_0 =   ( width / 2 )
                sub_height_1 = sub_height_0   = height
        }
         if(btSplitMode==HOR_UP)
        {
         x1 = x0
                sub_width_1 = sub_width_0 =   width
                if( height % 3 != 0) {
                y1 = y0 + ( height / 4 )
                   sub_height_0 = (height  / 4)
                   sub_height_1 = ( (height   * 3) / 4)
                 } else {
                 y1 = y0 + ( height / 3 )
                   sub_height_0 = (height    / 3)
                   sub_height_1 = ( (height   * 2)   / 3)
        }
         if(btSplitMode==HOR_DOWN)
        {
         x1 = x0
                sub_width_1 = sub_width_0 =   width
                if( height % 3 != 0) {
                y1 = y0 + ((height * 3) / 4 )
                   sub_height_0 = ( (height   * 3) / 4)
                   sub_height_1 = (height    / 4)
                 } else {
                 y1 = y0 + ( (height * 2) / 3 )
                   sub_height_0 = ( (height   * 2) / 3)
                   sub_height_1 = (height    / 3)
                }
        }
         if(btSplitMode==VER_LEFT)
        {
         y1 = y0
                sub_height_1 = sub_height_0 = height
                if( width % 3 != 0) {
                 x1 = x0 + ( width / 4 )
                   sub_width_0 =   width / 4
                   sub_width_1 =   (width *3) / 4
                 } else {
                 x1 = x0 + ( width / 3 )
                   sub_width_0 =   width / 3
                   sub_width_1 =   (width * 2) / 3
                }
        }
         if(btSplitMode==VER_RIGHT)
        {
         y1 = y0
                sub_height_1 = sub_height_0 = height
                if( width % 3 != 0) {
                x1 = x0 + ( width*3) / 4
                   sub_width_0 =   (width*3) / 4
                   sub_width_1 =   width   / 4
                 } else {
                 x1 = x0 + ( width * 2) / 3
                   sub_width_0 =   (width * 2) / 3
                   sub_width_1 =   width / 3
                }
        }
       coding_binary_tree( x0, y0, sub_width, sub_height, cqtDepth )
       if( x1 < pic_width_in_luma_samples   && y1 < pic_height_in_luma_samples)
            coding_binary_tree( x1, y1, sub_width, sub_height, cqtDepth )
       }
   } else
          coding_unit( x0, y0, width, height )
}
```

Figure 12:
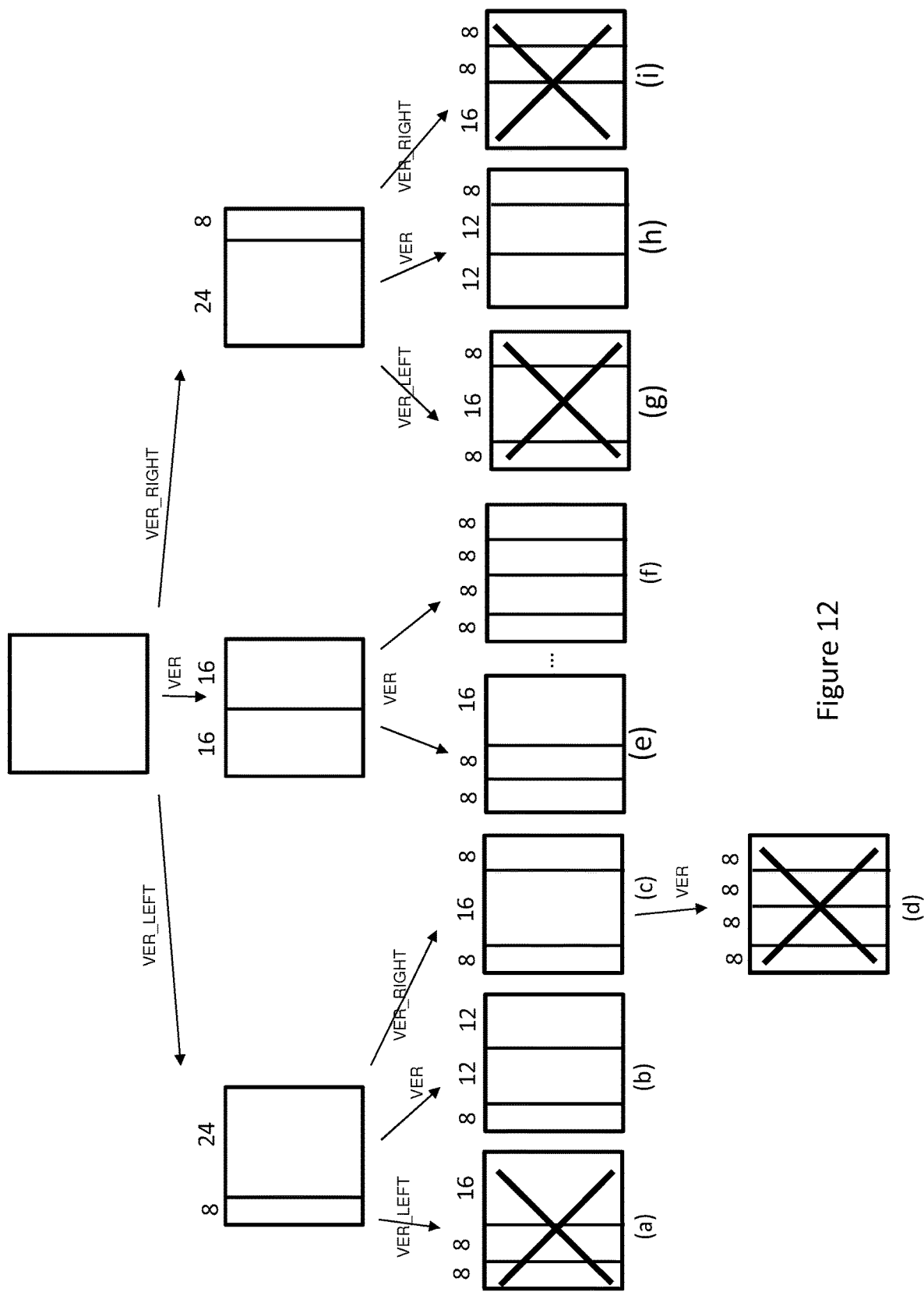
FIG. 12 shows removal of redundancy with proposed block size dependent ratio for vertical split using one general aspect described herein.
Figure 13:
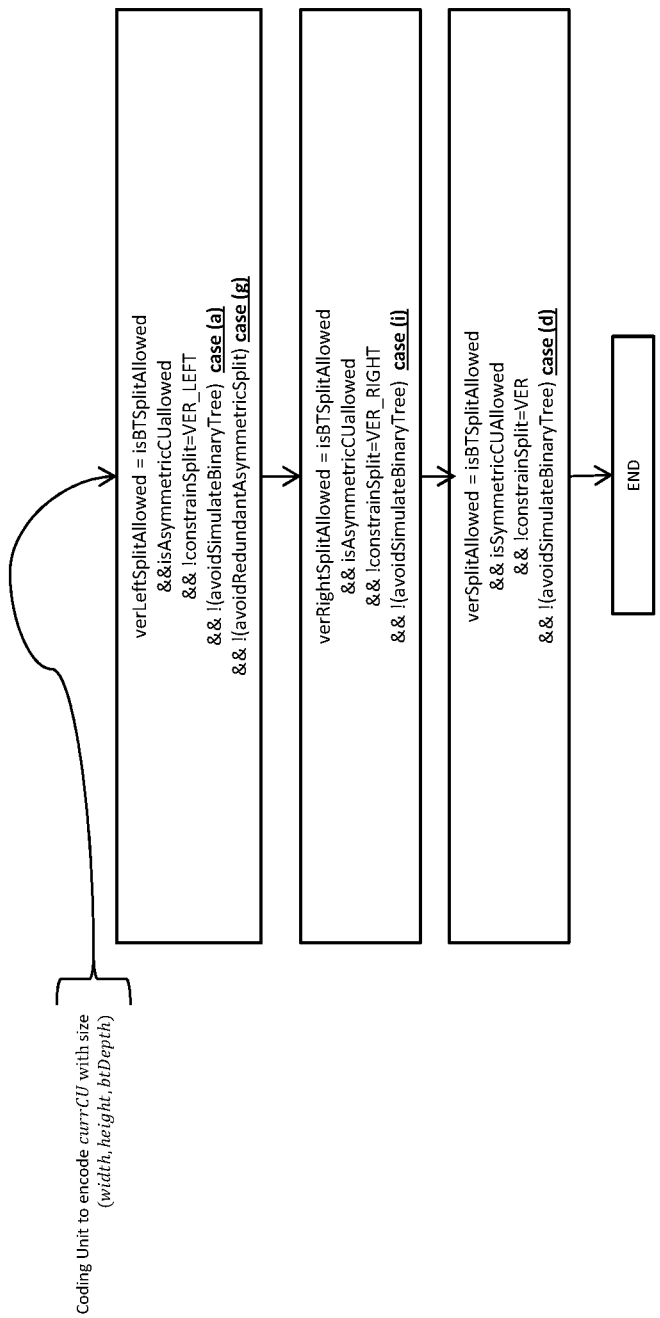
FIG. 13 shows a flow chart to get availability of all vertical splits using one general aspect described herein.
Figure 14:
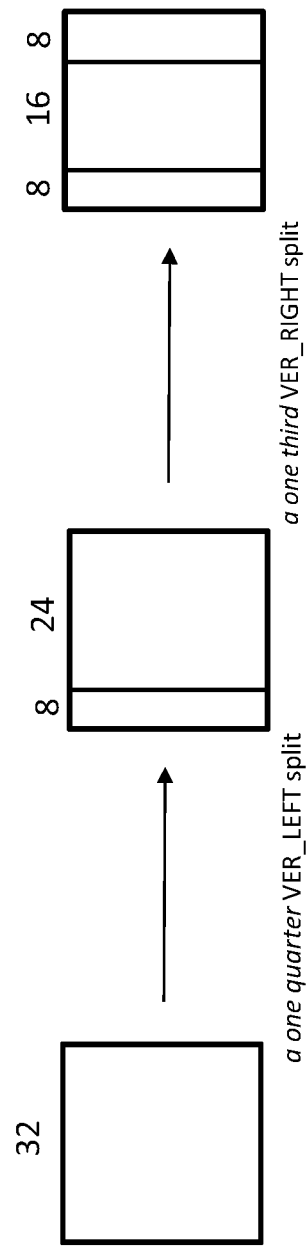
FIG. 14 shows inference of a one third split after a one quarter split.

In embodiment 2, splitting of asymmetric CUs leads to more redundancy in the syntax, many successive splits lead to the same partitioning. In FIG. 12, we show many possible binary trees for vertical and asymmetric vertical splits. To define a unicity in the syntax representing a binary tree, we forbid to use asymmetric split to simulate a binary tree that can be represented only by Vertical and Horizontal splits (tree (a), (d) and (i) in FIG. 12 can be represented by (e) and (f)). We also forbid to have the same binary tree by using different successions of asymmetric splits (tree (g) in FIG. 12 can be achieved by (c)). For a given block, some splits are forbidden, the Binary-tree syntax is changed accordingly.

Figure 11:
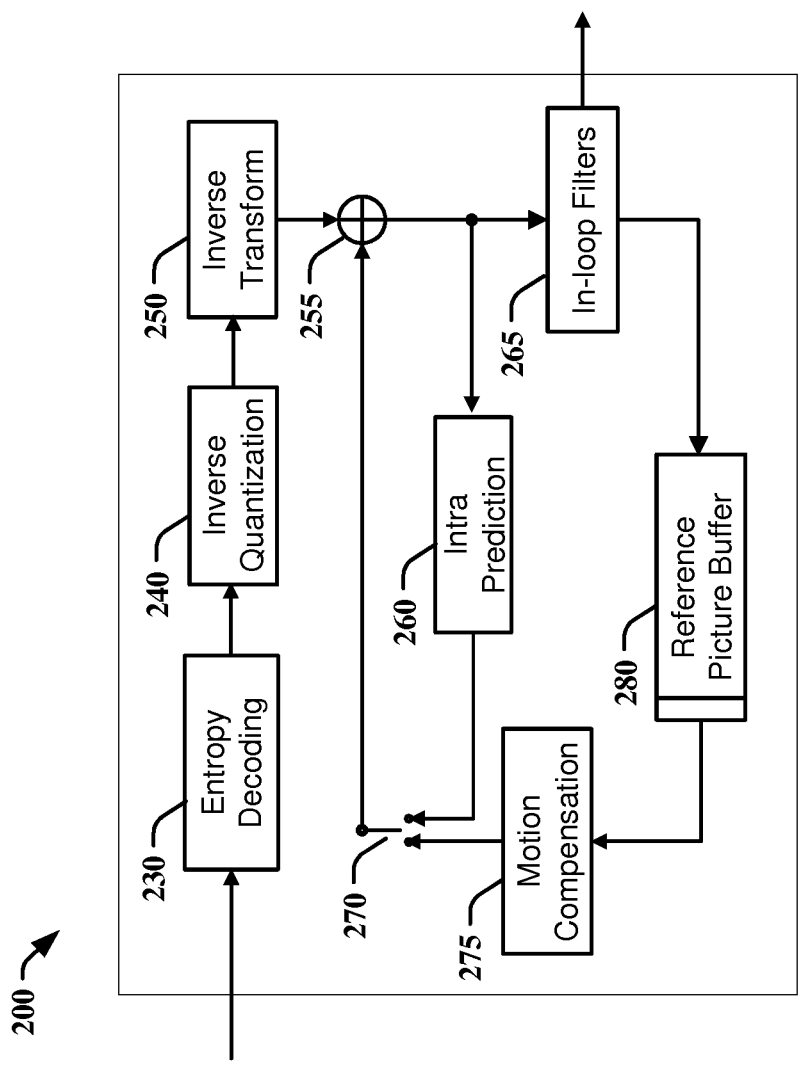
FIG. 11 shows a generic video decompression scheme.

The codec module that is impacted concerns the division of the picture to code/decode in blocks (see 105 in FIG. 10) with various square and rectangular sizes. Entropy coding (145 in FIGS. 10 and 230 in FIG. 11) is also impacted, with respect to the signaling of the quad-tree and binary-tree representation of a Coding Tree Unit.

A third embodiment is now described. Some ACU block sizes play a specific role. For some pre-defined block sizes, we may not want to have a dedicated transform. For example, for a large transform (typically 48×N), there is no dedicated transform in order to limit the transform memory buffer size. On the contrary, for small blocks (typically 12×N), there are advantages to having an asymmetric split compared to a symmetric split. Therefore, the CU with these sizes is used as a transition towards some sub-CUs. It is done by inferring after a one quarter split, a one third split on the other side. For example, signaling of a first split corresponding to VER_LEFT leads to inferring a second split corresponding to VER_RIGHT.

Figure 15:
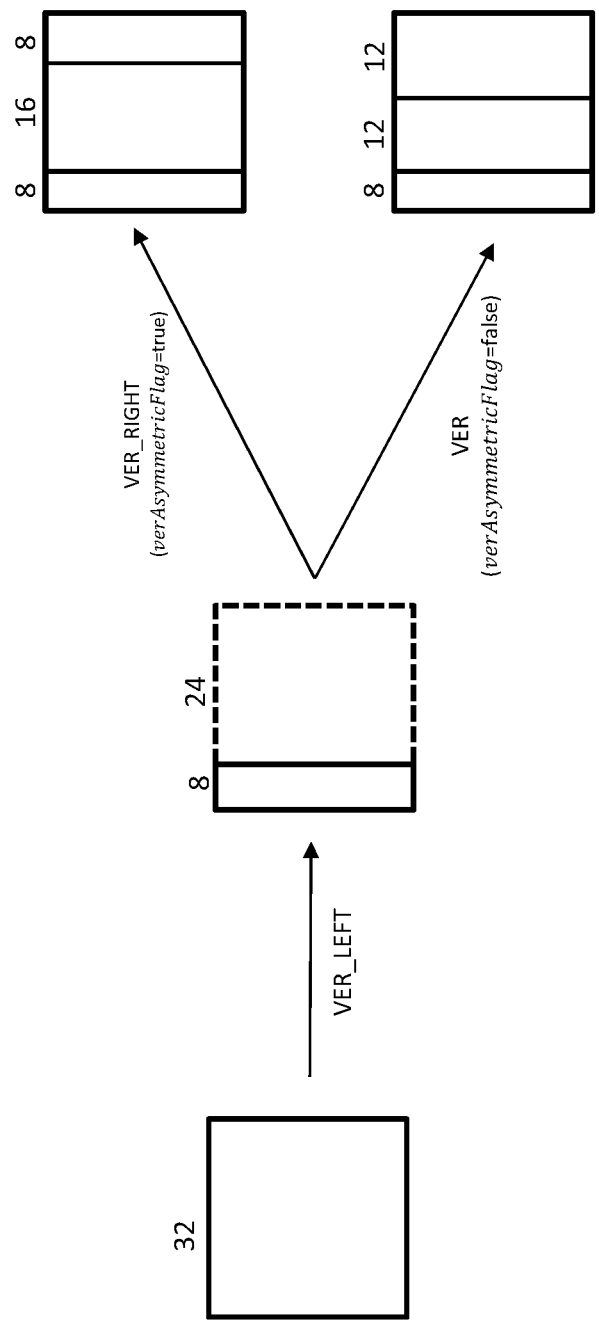
FIG. 15 shows one embodiment of a transform size considered as a transition stage using one general aspect described herein.
Figure 16:
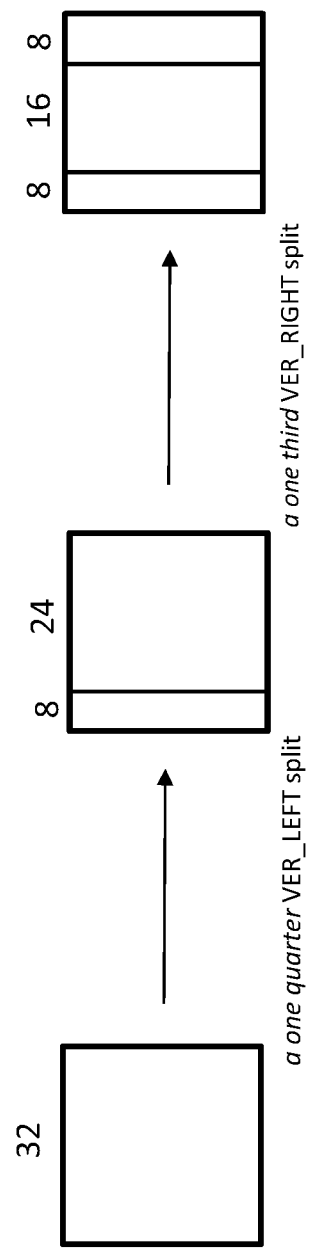
FIG. 16 shows an inference of a one third split after a one quarter split.

According to a fourth embodiment, some CU size are used as a transition stage towards multiple possible splitting configurations. An example is illustrated in FIG. 15. In the particular case of FIG. 15, the 24×32 CU size is considered only as a transition CU and not a possible coding CU. This means a CU with this size is considered as an intermediate stage towards a further sub-divided situation, chosen by the encoder among several possibilities. Indeed, by vertically dividing a CU with width 24, it is possible to generate either two subCUs with respective width 16 and 8, or to generate two subCUs with respective sizes equal to 12 and 12. For example, a first split corresponding to VER_LEFT leads to inferring a second split, but the choice for one of several splits needs to be signaled. In the case of FIG. 15, there is a choice of two possible splits.

This respectively corresponds to the binary splitting modes VER_RIGHT and VER, as shown in FIG. 15.

The support for transition CUs can be performed through a truncated syntax for the BT split mode signaling, compared to the initial complete syntax of Table 2. The bt split mode syntax for a CU that is known as a transition CU in one orientation (here the exemplary vertical orientation is considered) is depicted by Table 3. As can be seen, some syntax elements have been removed. First, the btSplitFlag is omitted, since we know the CU is necessarily subdivided. Moreover, if the vertical binary splitting is used for this transition CU, then only the verticalAsymmetricFlag syntax element is signaled for that CU, and the vertical_split_type syntax element is not signal, because the VER_LEFT bt split type is forbidden to avoid emulating 2 successive symmetric vertical splittings.

TABLE 2 bt split mode syntax according used for coding CUs, according to the initial asymmetric CU tool

|  | Descriptor |
|---|---|
| Bt_split_mode(x0,y0,width,height,cqtDepth){ | |
|   if(btSplitAllowed(x0,y0,width,height){ | |
|     btSplitFlag | ae(v) |
|     if(horizontalSplitAllowed && horizontalSplitAllowed){ | |
|       btSplitOrientation | ae(v) |
|       if(btSplitOrientation==HOR && horizontal_asymmetric_allowed){ | |
|         horAsymmetricSplitFlag | ae(v) |
|         if(horAsymmetricSplitFlag==true){ | |
|           horizontal_asymmetric_type | ae(v) |
|         } | |
|       } | |
|       if(btSplitOrientation==VER && vertical_asymmetric_allowed){ | |
|         verAsymmetricSplitFlag | ae(v) |
|         if(verAsymmetricSplitFlag==true){ | |
|           vertical_asymmetric_type | ae(v) |
|         } | |
|       } | |
|     } | |
|   } | |
| } | |

TABLE 3 modified bt split mode syntax according to signal the splitting of a transition CU in the vertical orientation

|  | Descriptor |
|---|---|
| Bt_split_mode(x0,y0,width,height,cqtDepth){ | |
|   if(btSplitAllowed(x0,y0,width,height){ | |
|     ~~btSplitFlag~~ | ae(v) |
|     if(horizontalSplitAllowed && horizontalSplitAllowed){ | |

TABLE 3-continued modified bt split mode syntax according to signal the splitting
of a transition CU in the vertical orientation

|  | Descriptor |
|---|---|
| btSplitOrientation | ae(v) |
| if(btSplitOrientation==HOR && horizontal_asymmetric_allowed){ |  |
|     horAsymmetricSplitFlag | ae(v) |
|     if(horAsymmetricSplitFlag==true){ |  |
|         horizontal_asymmetric_type | ae(v) |
|     } |  |
| } |  |
| if(btSplitOrientation==VER && vertical_asymmetric_allowed) { |  |
|     verAsymmetricSplitFlag | ae(v) |
|     ~~if(verAsymmetricSplitFlag==true){~~ |  |
|         ~~vertical_asymmetric_type~~ | ~~ae(v)~~ |
|     ~~}~~ |  |
| } |  |
| } |  |

According to variants of these embodiments, some CU size/orientation case can be considered a transition stages towards further subdivided configurations:

- 48×N: CU width equal to 48. According to some variant, N can be one or several values in the set {4,6,8,12,16, 24,32,48,64}
- N×48: CU height equal to 48. According to some variant, N can be one or several values in the set {4,6,8,12,16, 24,32,48,64}
- 24×N: CU width equal to 24. According to some variant, N can be one or several values in the set {4,6,8,12,16, 24,32,48,64}
- N×24: CU height equal to 24. According to some variant, N can be one or several values in the set {4,6,8,12,16, 24,32,48,64}

The aforementioned embodiments have been described with respect to an encoder or encoding operation. However, the corresponding inverse operations are applicable to a decoder or decoding operation. For example, a decoding operation can perform decoding of at least one sub-block of a plurality of sub-blocks that comprise the block, using processing such that a transform that corresponds to each sub-block size is used, and reassembling the plurality of sub-blocks into the block, wherein reassembling comprises an inverse operation of dividing the block. The reassembling operation is substantially the inverse of the encoding dividing operations.

Figure 17:
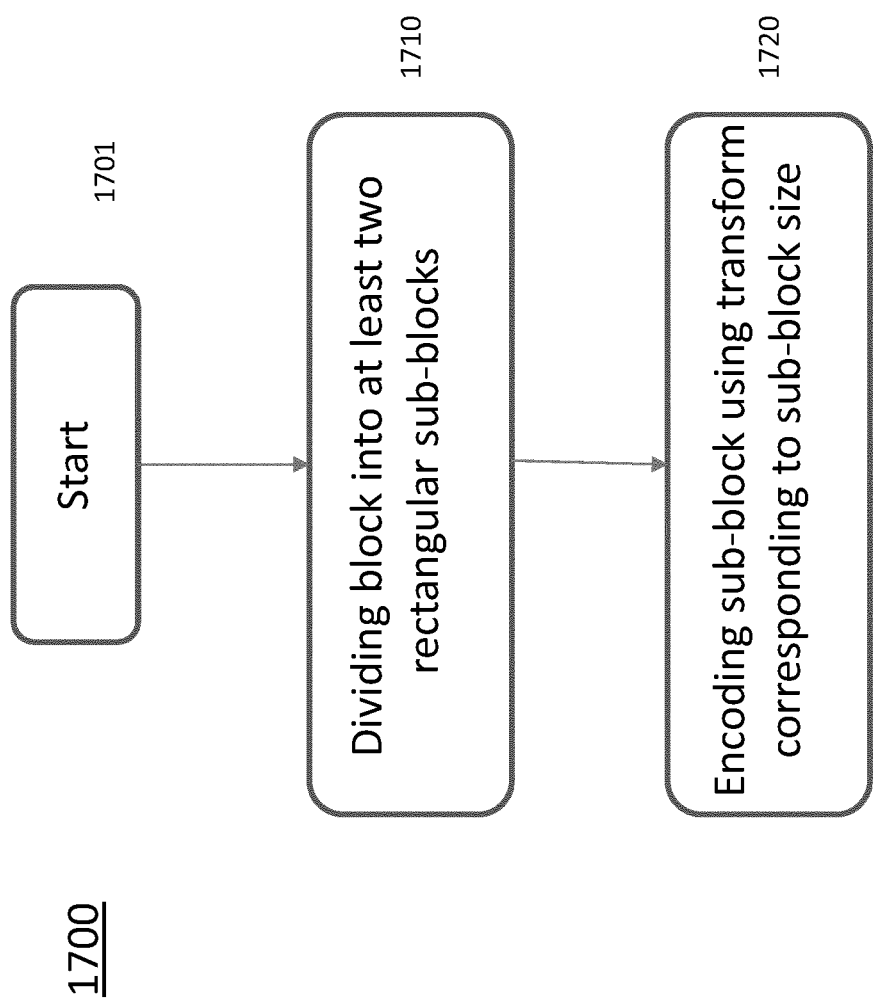
FIG. 17 shows one embodiment of a method for encoding a video block using one general aspect described herein.

FIG. 17 shows one embodiment of a method 1700 for coding a block of video data. The method commences at Start block 1701 and proceeds to block 1710 for dividing the block into at least two rectangular sub-blocks. Control proceeds from block 1710 to block 1720 for encoding each sub-block using processing such that a transform that corresponds to each sub-block size is used.

Figure 18:
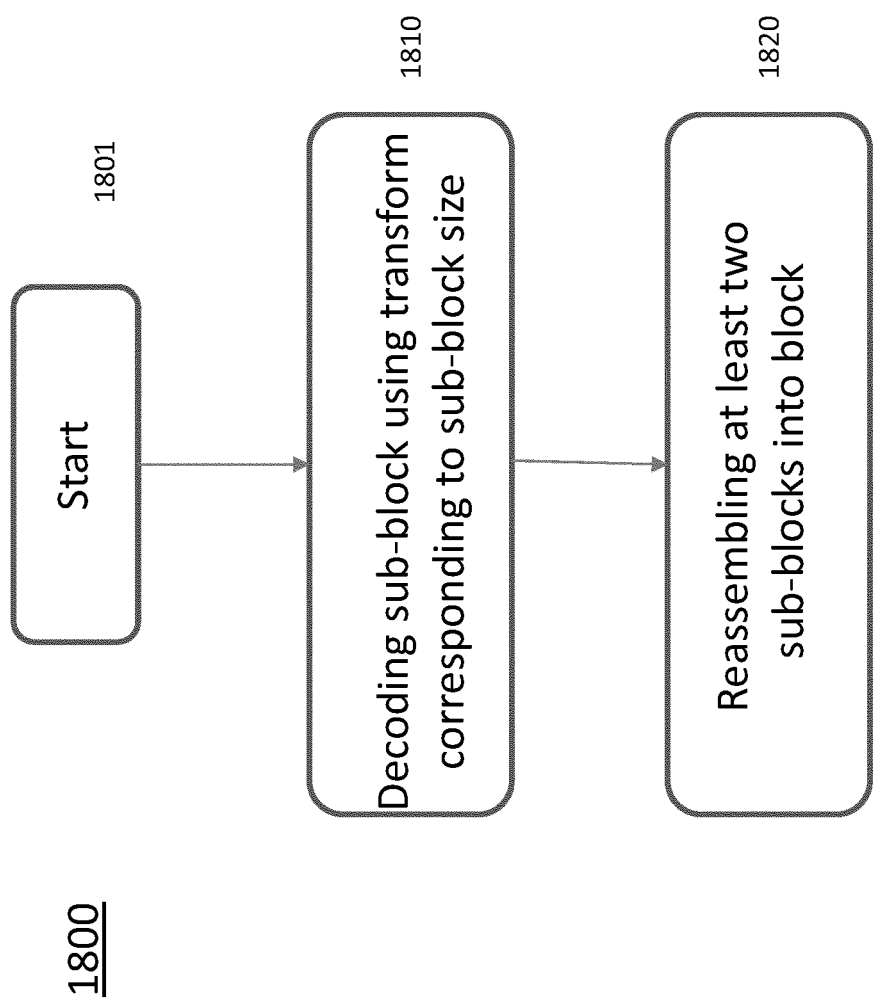
FIG. 18 shows another embodiment of a method for decoding a video block using one general aspect described herein.

FIG. 18 shows one embodiment of a method 1800 for decoding a block of video data. The method commences at Start block 1801 and proceeds to block 1810 for decoding at least one sub-block of a plurality of sub-blocks that comprise the block using processing such that a transform that corresponds to each sub-block size is used. Control then proceeds from block 1810 to block 1820 for reassembling the plurality of sub-blocks into the block, wherein reassembling comprises an inverse operation of dividing the block.

Figure 19:
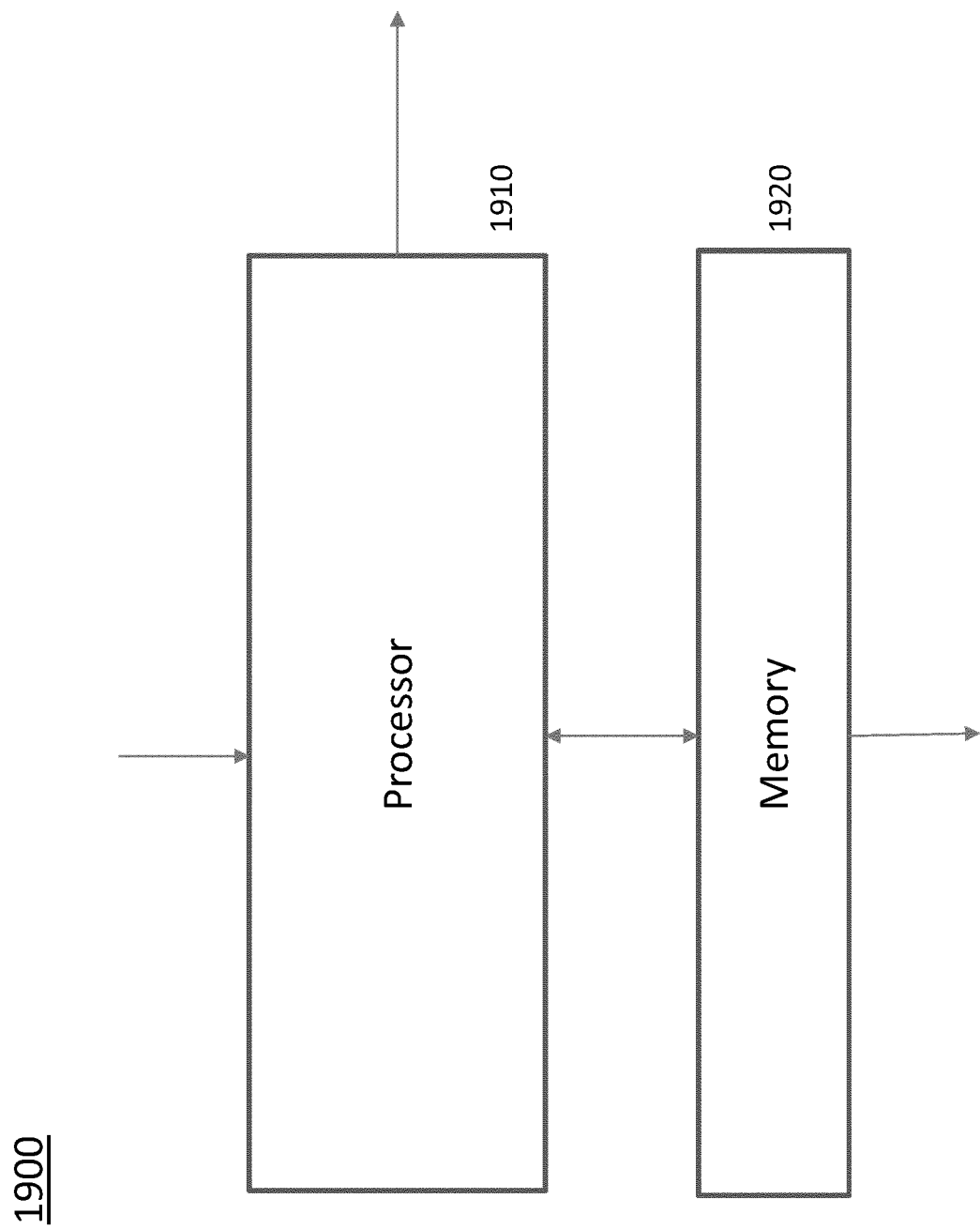
FIG. 19 shows one embodiment of an apparatus for encoding or decoding a block of video data using at least one general aspect described herein.

FIG. 19 shows one embodiment of an apparatus 1900 for coding or decoding a block of video data. The apparatus comprises Processor 1910 which has input and output ports and is in signal connectivity with Memory 1920, also having input and output ports. The apparatus can execute any of the aforementioned method embodiments, or variations.

Figure 20:
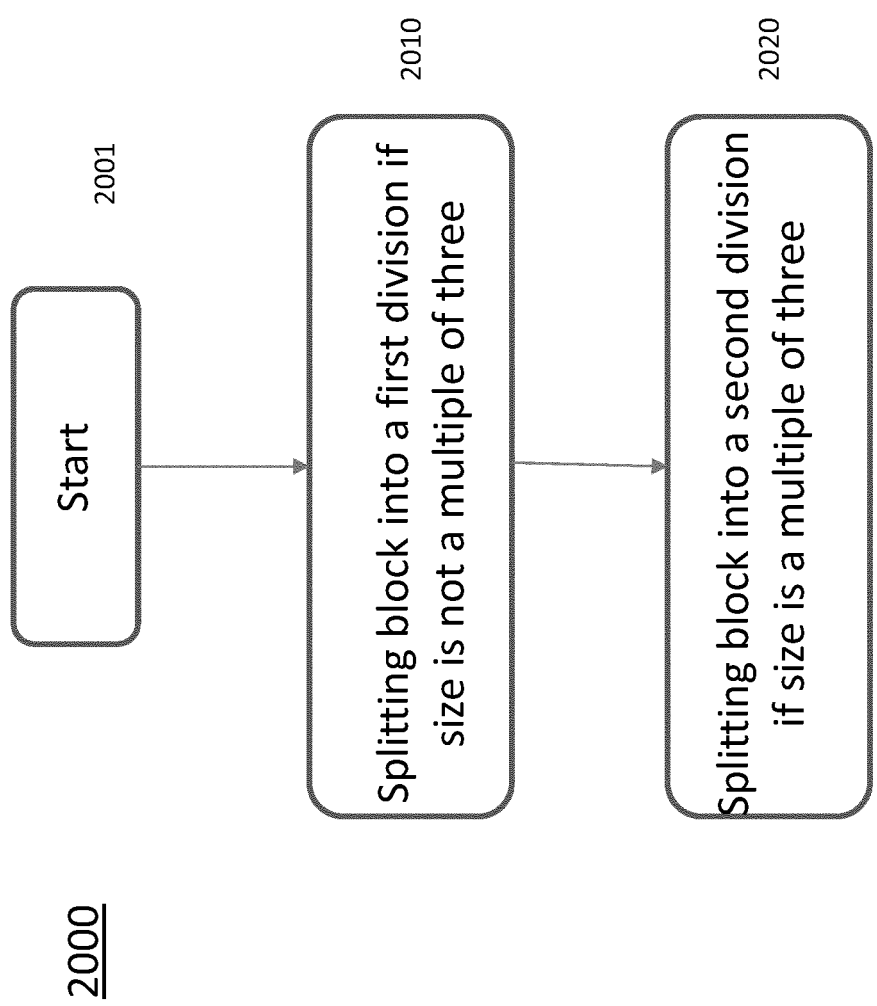
FIG. 20 shows another embodiment of a method for dividing a block of video data using at least one general aspect described herein.

FIG. 20 shows another embodiment of a method 2000 to implement the dividing of the aforementioned method or apparatus embodiments. The method commences at Start block 2001 and proceeds to block 2010 for splitting a block into a first division of multiple sub-blocks if said block has a size dimension that is not a multiple of three. Control proceeds from block 2010 to block 2020 for splitting the block into a second division of multiple sub-blocks if the block has a size dimension that is a multiple of three.

FIG. 21 shows another embodiment of a method 2100 to implement the dividing of the aforementioned method or apparatus embodiments. The method commences at Start block 2101 and proceeds to block 2110 for splitting the block into a first division of multiple sub-blocks. Control proceeds from block 2110 to block 2120 for splitting at least one of the sub-blocks into a second division of multiple smaller sub-blocks, based on the first division.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

The present description illustrates the present ideas. It will thus be appreciated that those skilled in the art will be able to devise various arrangements that, although not explicitly described or shown herein, embody the present ideas and are included within its scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

The invention claimed is:

1. A method for coding a block of video data, comprising:
  dividing said block into at least two rectangular sub-blocks, and
  encoding each sub-block using processing such that a transform that corresponds to each sub-block size is used, wherein said dividing comprises:
  splitting said block into at least two rectangular sub-blocks using horizontal or vertical divisions, wherein successive divisions using asymmetric splitting are forbidden if an equivalent split can be attained using only symmetrical splitting, and wherein only one succession of divisions is permitted when there are other successions of asymmetric splitting that result in identical sub-blocks.

2. A method for decoding a block of video data, comprising:
  decoding at least one sub-block of a plurality of sub-blocks that comprise said block, using processing such that a transform that corresponds to each sub-block size is used, and reassembling the plurality of sub-blocks into said block, wherein
  reassembling comprises an inverse operation of dividing the block, wherein said dividing comprises:
  splitting said block into at least two rectangular sub-blocks using horizontal or vertical divisions, wherein successive divisions using asymmetric splitting are forbidden if an equivalent split can be attained using only symmetrical splitting, and wherein only one succession of divisions is permitted when there are other successions of asymmetric splitting that result in identical sub-blocks.

3. The method of claim 2, wherein said dividing further comprises:
  splitting the block into a first division of multiple sub-blocks if said block has a size dimension that is not a multiple of three, and
  wherein the block is split into a second division of multiple sub-blocks if said block has a size dimension that is a multiple of three.

4. The method or the apparatus of claim 3, wherein said first division is a one-fourth and three-fourths split, and said second division is a one-third and two-thirds split.

5. The method or the apparatus of claim 3, wherein said size dimension is height.

6. The method or the apparatus of claim 3, wherein said size dimension is width.

7. The method of claim 2, wherein said dividing comprises:
  splitting said block into a first division of multiple sub-blocks;
  splitting at least one of said sub-blocks into a second division of multiple, smaller sub-blocks, based on said first division.

8. The method or the apparatus of claim 7, wherein a mode representative of said second division is signaled.

9. An apparatus for coding a block of video data, comprising:
  a memory, and
  a processor, configured to:
  divide said block into at least two rectangular sub-blocks, and
  encode each sub-block using processing such that a transform that corresponds to each sub-block size is used, wherein said dividing comprises:
  splitting said block into at least two rectangular sub-blocks using horizontal or vertical divisions, wherein successive divisions using asymmetric splitting are forbidden if an equivalent split can be attained using only symmetrical splitting, and wherein only one succession of divisions is permitted when there are other successions of asymmetric splitting that result in identical sub-blocks.

10. An apparatus for coding a block of video data, comprising:
  a memory, and
  a processor, configured to:
  decode at least one sub-block of a plurality of sub-blocks that comprise said block, using processing such that a transform that corresponds to each sub-block size is used, and
  reassemble the plurality of sub-blocks into said block, wherein reassembling comprises an inverse operation of dividing the block, wherein said dividing comprises:
  splitting said block into at least two rectangular sub-blocks using horizontal or vertical divisions, wherein successive divisions using asymmetric splitting are forbidden if an equivalent split can be attained using only symmetrical splitting, and wherein only one succession of divisions is permitted when there are other successions of asymmetric splitting that result in identical sub-blocks.

11. A non-transitory computer readable medium containing data content generated according to the method of claim 1, for playback using a processor.

12. A non-transitory computer program product comprising instructions which, when the program is executed by a computer, cause the computer to generate a signal comprising video data generated according to the method of claim 1, for playback using a processor.

13. A non-transitory computer program product comprising instructions which, when the program is executed by a computer, cause the computer to carry out the method of claim 2.

\* \* \* \* \*